(12) United States Patent
Cox et al.

(10) Patent No.: US 7,186,929 B2
(45) Date of Patent: Mar. 6, 2007

(54) SEALING MEMBER FOR AN ENTRY PORT

(75) Inventors: Larry R. Cox, Austin, TX (US); Dean C. Krenz, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/177,838

(22) Filed: Jul. 8, 2005

(65) Prior Publication Data

US 2007/0007038 A1    Jan. 11, 2007

(51) Int. Cl.
*H02G 3/18*    (2006.01)
(52) U.S. Cl. .................. 174/650; 174/656; 174/152 G; 174/153 G; 16/2.1; 16/2.2; 248/56
(58) Field of Classification Search .............. 174/65 G, 174/135, 152 G, 152 R, 153 G, 151, 650, 174/652, 656, 658, 665, 72 A, 155; 16/2.1, 16/2.2; 248/56; 439/271, 274, 275; 277/314, 277/312; 385/134, 135
See application file for complete search history.

(56) References Cited

U.S. PATENT DOCUMENTS

| | | | |
|---|---|---|---|
| 2,922,836 A | | 1/1960 | Brown |
| 3,109,055 A | * | 10/1963 | Ziegler .................... 174/152 R |
| 3,761,601 A | * | 9/1973 | Kaesser et al. ............ 174/52.1 |
| 3,836,701 A | | 9/1974 | Worden |
| 4,180,297 A | * | 12/1979 | Abrams ................... 174/153 G |
| 4,726,788 A | * | 2/1988 | F'Geppert ................... 439/271 |
| 4,805,979 A | | 2/1989 | Bossard et al. |
| 5,258,578 A | | 11/1993 | Smith et al. |
| 5,408,740 A | * | 4/1995 | Dee ........................... 174/650 |
| 5,770,257 A | | 6/1998 | Shreve et al. |
| 5,907,653 A | * | 5/1999 | Burek et al. ................ 385/135 |
| 5,920,035 A | * | 7/1999 | Haney et al. ............. 174/65 G |
| 6,010,134 A | | 1/2000 | Katoh |
| 6,037,544 A | | 3/2000 | Lee et al. |
| 6,064,006 A | | 5/2000 | Pulido et al. |
| 6,174,118 B1 | | 1/2001 | Rebers et al. |
| 6,184,467 B1 | * | 2/2001 | Milanowski et al. ..... 174/65 G |
| 6,242,700 B1 | | 6/2001 | Smith |
| 6,274,812 B1 | * | 8/2001 | Daoud ......................... 248/56 |

(Continued)

FOREIGN PATENT DOCUMENTS

DE    299 08 044 U1    9/1999

(Continued)

OTHER PUBLICATIONS

U.S. Application entitled "Sealing Member for Enclosures", filed Aug. 30, 2004, having U.S. Appl. No. 10/929,659.

(Continued)

*Primary Examiner*—Angel R. Estrada
(74) *Attorney, Agent, or Firm*—Gregg H. Rosenblatt

(57) ABSTRACT

A sealing member includes an elastomeric interior portion and a rigid exterior portion. At least one passage extends through the elastomeric interior portion from a first end to a second end of the sealing member. The passage is configured to receive at least one longitudinal member therein. The elastomeric interior portion is configured for sealing engagement with the longitudinal member extending therethrough, and the rigid exterior portion is configured for sealing engagement with an entry port of an enclosure.

11 Claims, 3 Drawing Sheets

U.S. PATENT DOCUMENTS

| | | |
|---|---|---|
| 6,284,976 B1 | 9/2001 | Pulido et al. |
| 6,353,186 B1 | 3/2002 | Dams et al. |
| 6,721,483 B2 | 4/2004 | Grubish et al. |

FOREIGN PATENT DOCUMENTS

| | | |
|---|---|---|
| EP | 0 695 900 A1 | 2/1996 |
| FR | 2 694 655 | 2/1994 |
| GB | 2 341 014 A | 3/2000 |

OTHER PUBLICATIONS

"3M Fiber Optic Splice Case 2178-XSB Flame Retardant Splice Case 2178-XSBFR" Brochure (pp. 1-8), 3M ref No. 78-8135-0094-5-D., by 3M Communication Markets Divison Apr. 2005. <www.3MTelecommunications.com>.

* cited by examiner

SEALING MEMBER FOR AN ENTRY PORT

THE FIELD OF THE INVENTION

The present invention generally relates to enclosures having openings or entry ports for allowing members, such as cables, to pass into and out of the enclosure. More particularly, the present invention relates to a sealing member for use in the entry ports of such enclosures, the sealing member configured to seal around one or more members as they pass through an entry port in a wall of the enclosure.

BACKGROUND OF THE INVENTION

Cables, such as telecommunication cables and electrical power distribution cables, are ubiquitous and used for distributing electrical power and all manner of data across vast networks. The majority of cables are electrically conductive cables (typically copper), although the use of optical fiber cables is growing rapidly in telecommunication systems as larger and larger amounts of data are transmitted. As cables are routed across power or data networks, it is necessary to periodically open or splice the cable so that power or data may be distributed to other cables or "branches" of the network. The cable branches may be further distributed until the network reaches individual homes, businesses, offices, and so on.

At each point where the cable is opened, it is necessary to provide some type of enclosure to protect the exposed interior of the cable. Commonly, the enclosure has one or more ports through which cables enter and/or exit the enclosure. For ease of description, the ports are generally referred to herein "entry ports". However, it is understood and intended that the term "entry port" includes any and all ports through which cables or other members enter and/or exit the enclosure. Depending upon the number of entry ports in the enclosure, the sizes of the entry ports, the number of cables entering the enclosure, and the sizes of the cables, the number of cables passing through the each entry port will vary. Often, especially with smaller diameter cables as are typically used in distributed lines, multiple cables are bundled for placement into a single larger entry port. This is particularly common where multiple smaller cables are routed from a single point to multiple locations, such as individual homes, buildings, offices, etc.

At each entry port, no matter the number of cables passing therethrough, it is often desirable or necessary to provide a seal around the cables to prevent the ingress of moisture, dust, insects, and the like into the enclosure. Current methods of providing a seal around the cables typically involve bundling cables with mastic materials, rubber-like tapes, self-vulcanizing tapes, gels, potting compounds, and the like. Such sealing methods are replete with disadvantages. The quality of the resulting seal is highly dependent upon the skill of the installer, and the reliability of the seal is therefore typically inconsistent from one installer to another. Further, as the number of cables increases, it becomes more and more difficult to form a reliable seal. Many of the technologies used to form a seal also present difficulties when it is desired to re-enter the enclosure, such as when adding or removing cables in the entry port. Specifically, the old sealing materials must be removed without damaging the cables, and a new seal must be constructed. The removal and reconstruction of the seal requires the use of additional time and materials, and therefore adds to the cost of maintaining or expanding the network.

To address the disadvantages of seals formed with mastic, rubber-like tape, and the like as described above, pre-formed grommets have been used to expand the capacity of entry ports in an enclosure. Typically, the grommets are sized to fit within an enclosure entry port, and have a predetermined number of holes for accepting smaller diameter cables. The cables are threaded through the holes in the grommet, and the grommet is in turn secured within the entry port. Existing grommet sealing devices also have disadvantages. In particular, entry ports of many enclosures are lined with a soft or pliable gasketing material, such as neoprene or rubber, for creating a compressive seal with cables extending through the entry port. Forming a reliable seal with the gasketing material of the entry port and also with cables extending through the grommet is difficult. If the grommet is pliable enough to satisfactorily seal around the feed-through cables, then it is typically too soft to create a satisfactory seal with the entry port gasket. On the other hand, if the grommet is hard enough to seal satisfactorily against the entry port gasket, then it is too stiff to seal adequately around the feed-through cables.

A need exists for a sealing member that enables an installer to produce a reliable seal with gasketed enclosure entry ports, independent of the skill level of the installer. Furthermore, a need exists for a seal that can be easily and quickly installed, and that can be easily re-entered and re-used multiple times without seal degradation.

SUMMARY OF THE INVENTION

In one aspect, the invention described herein provides a sealing member for use in an entry port of an enclosure. In one embodiment according to the invention, the sealing member comprises a body having an elastomeric interior portion and a rigid exterior portion. At least one passage extends through the elastomeric interior portion from a first end to a second end of the body. The at least one passage is configured to receive at least one longitudinal member therein. The elastomeric interior portion is configured for sealing engagement with a longitudinal member extending therethrough, and the rigid exterior portion is configured for sealing engagement with an entry port of an enclosure.

In another embodiment according to the invention, a sealing assembly for use in an entry port of an enclosure comprises a longitudinal elastomeric body and a rigid sleeve. The elastomeric body has an exterior circumferential surface, and a first end and a second end. At least one passage extends longitudinally through the elastomeric body from the first end to the second end, the at least one passage configured to sealingly engage a component therein. The rigid sleeve has an interior circumferential surface and an exterior circumferential surface. The interior circumferential surface of the sleeve sealingly engages the exterior circumferential surface of the elastomeric body, and the exterior circumferential surface of the sleeve is configured for sealing engagement with an entry port of an enclosure.

In another aspect, the invention described herein also provides an assembly comprising an enclosure having an entry port lined with a pliable gasket. A rigid sleeve has an interior circumferential surface and an exterior circumferential surface. The exterior circumferential surface of the sleeve sealingly engages the pliable gasket lining the entry port of the enclosure. An elastomeric body has an exterior circumferential surface, a first end and a second end, and at least one passage extending longitudinally through the elastomeric body from the first end to the second end. The at least one passage is configured to sealingly engage a component therein, and the exterior circumferential surface of the elastomeric body sealingly engages with the interior circumferential surface of the rigid sleeve.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

For purposes of clarity, the invention is described herein as used with cables. However, such use is exemplary only, and the term "cable" as used herein is understood and intended to include any member or component that passes through an entry port in an enclosure, including but not limited to telecommunication cables, electrical power cables, optical fiber cables, copper wire cables, coaxial cables, drop lines, branch lines, distribution lines, pipes and conduits, to name a few.

Figure 1:
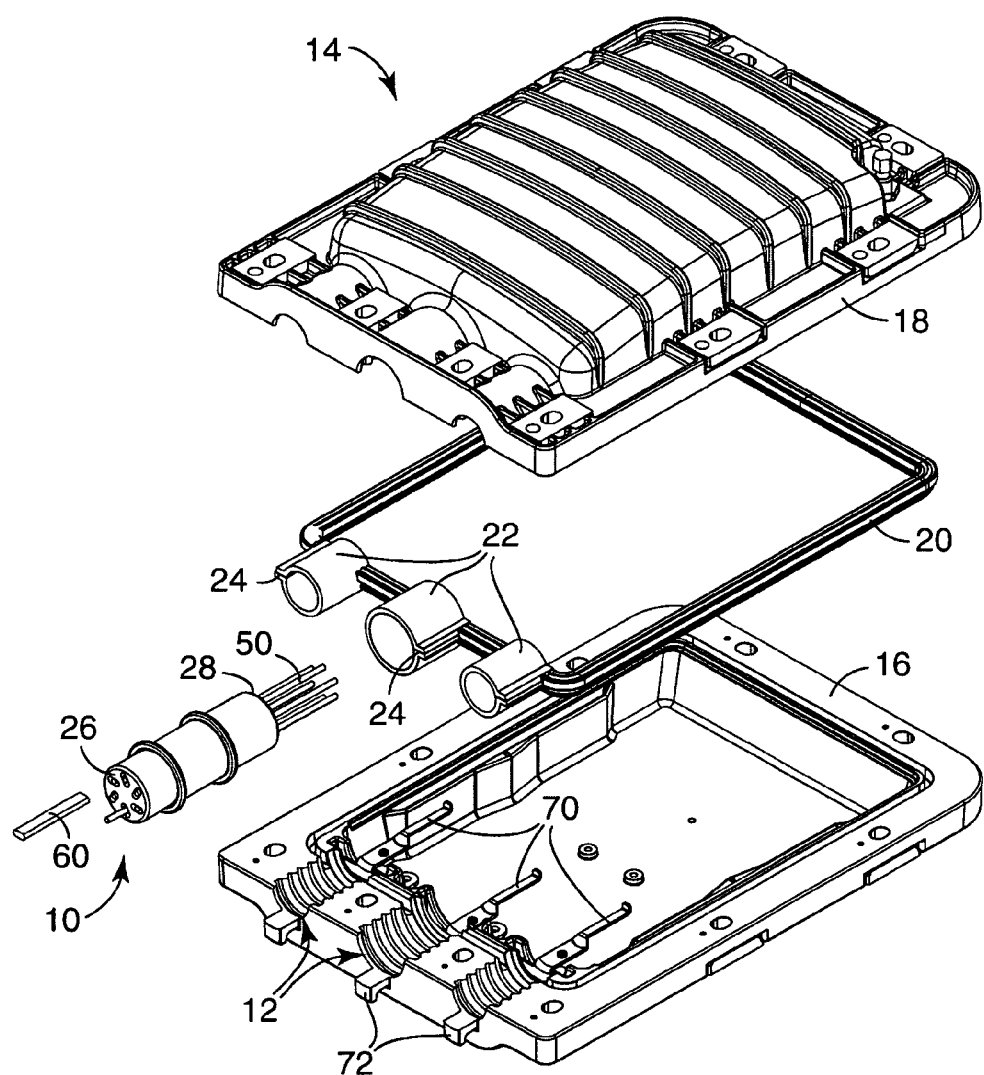
FIG. 1 is an exploded perspective view of an enclosure having a plurality of entry ports, and a sealing member according to one embodiment of the invention.

One embodiment of a sealing member 10 for consistently and reliably bundling multiple cables for placement into a single opening or entry port 12 of an enclosure 14 is illustrated in FIGS. 1–5. As best seen in FIG. 1, enclosure 14 includes separable bottom portion 16 and top portion 18, defining entry ports 12. Entry ports 12 allow passage of a single cable, or multiple cables in combination with sealing member 10. Enclosure 14 is illustrated in FIG. 1 with three entry ports 12, but in other embodiments enclosure 14 may have one, two, or any other number entry ports 12 as is desired for a particular enclosure 14. Although illustrated as completely separable in FIG. 1, in other embodiments bottom portion 16 and top portion 18 may be moveably engaged, as by a hinge or the like. In other embodiments, enclosure 14 may comprise any size or shape. In one embodiment, the enclosure comprises a building, and entry ports 12 extend through a wall of a building.

Enclosure 14 is formed from any suitable material. Suitable materials may include, for example, polymeric materials, sheet metal, and cast metal, to name a few. Material selection will depend upon factors including, but not limited to, chemical exposure conditions, environmental exposure conditions including temperature and humidity conditions, and flame-retardancy requirements, to name a few. In one embodiment, enclosure 14 is formed from polypropylene with approximately 35% calcium carbonate. In one embodiment, the material of enclosure 14 has a modulus of elasticity in the range of 175,000–300,000 psi. In one embodiment, the material of enclosure 14 has a tensile strength at yield in the range of 3200 psi.

A sealing gasket 20 is positioned between bottom portion 16 and top portion 18 to form a seal against the ingress of moisture, dust, insects, and the like into enclosure 14 when bottom portion 16 and top portion 18 are joined together, as by locking bolts, clamping members, and so on. Gasket 20 includes entry port portions 22 that surround the circumference of each entry port 12, so as to maintain the continuity of the gasket and resulting seal around the periphery of the enclosure 14. In one embodiment, entry port portions 22 include longitudinal slits 24 extending therethrough. Slits 24 permit the entry port portion 22 of gasket 20 to be opened and sealing member 10 to be laid therein. In other embodiments, where the material of gasket 20 is sufficiently resilient, slits 24 are not provided in entry port portions 22 of gasket 20, and sealing member 10 is simply inserted through entry port portion 22 by stretching entry port portion 22 of gasket 20. In the illustrated embodiment, entry port portions 22 of gasket 20 are substantially wider than the remainder of the gasket 20, such that entry port portions 22 extend along substantially the entire length of the entry ports 12. In other embodiments, entry port portions 22 have substantially the same width as the remainder of gasket 20.

Gasket 20 is formed from any suitable material. Suitable materials may include, for example, elastomeric and polymeric materials, such as thermoplastic elastomers, vulcanite rubbers, polyurethane foams, reactive and non-reactive polymers, silicones, EPDMs, and soft plastics, to name a few. Material selection will depend upon factors including, but not limited to, chemical exposure conditions, environmental exposure conditions including temperature and humidity conditions, and flame-retardancy requirements, to name a few. In one embodiment, gasket 20 is formed from PVC/Nitrile. In one embodiment, the material of gasket 20 has a durometer in the range of 40 to 60 (Shore 'A'). In one embodiment, the material of gasket 20 has a tensile strength in the range of 1,000 to 1,600 psi.

Figure 2:
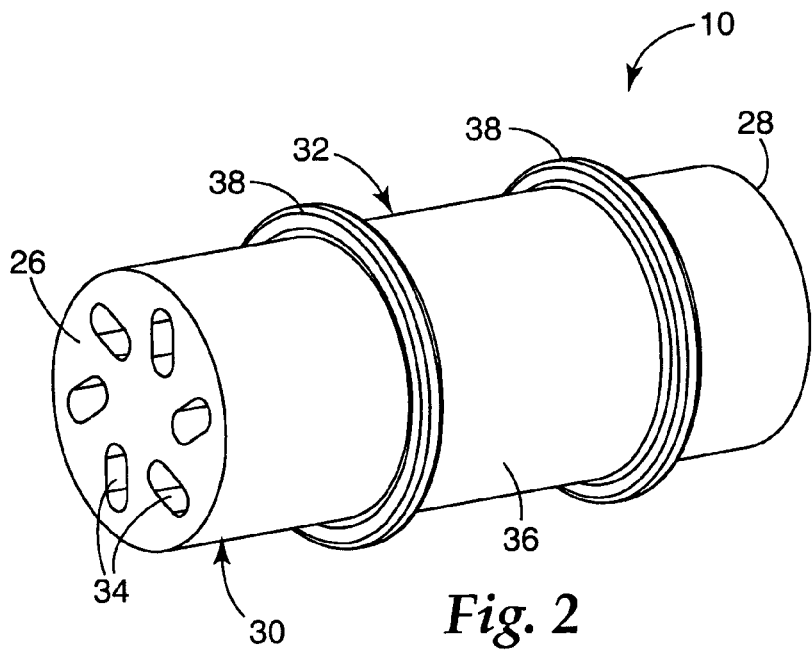
FIG. 2 is a perspective view of one embodiment of the sealing member according to the invention.

As better seen in isolation in FIG. 2, sealing member 10 includes a first end 26 and second end 28. Sealing member 10 has an elastomeric interior portion 30 and a comparatively hard or rigid exterior portion 32. Passages 34 extend through the elastomeric interior portion 30 from first end 26 to second end 28, and are configured to receive at least one longitudinal member, such as a cable, therein. Elastomeric interior portion 30 is configured for sealing engagement with longitudinal members extending therethrough, and rigid exterior portion 32 is configured for sealing engagement with an entry port 12 of enclosure 14, and particularly configured for sealing engagement with gasket 20 lining an entry port 12. The rigid exterior portion 32 provides a rigid sealing surface 36 for the soft, pliable material of gasket 20 when clamped in entry port 12 of enclosure 14. In one embodiment, rigid exterior portion 32 surrounds elastomeric interior portion 30 completely from first end 26 to second end 28. In another embodiment, rigid exterior portion 32 surrounds elastomeric interior portion 30 only partially between first end 26 to second end 28.

In one embodiment, annular ridges 38 extend circumferentially about exterior portion 32 of sealing member 10. Ridges 38 are configured to capture entry port gasket 20 therebetween when sealing member 10 is placed in entry port 12. Ridges 38 thereby prevent the soft, pliable gasket 20 from herniating along the axis of the entry port 12. Herniation of the gasket 20 results in a reduction of radial compressive forces on the sealing member 10, and thus lowers or eliminates the sealing capability of the seal between sealing member 10 and enclosure 14. Accordingly, the longitudinal spacing between ridges 38 will correspond to the width of entry port portion 22 of gasket 20. In another embodiment, sealing member 10 does not have any annular ridges. Rather, gasket containment features, such as ridges, are provided as part of enclosure 14.

Figure 3:
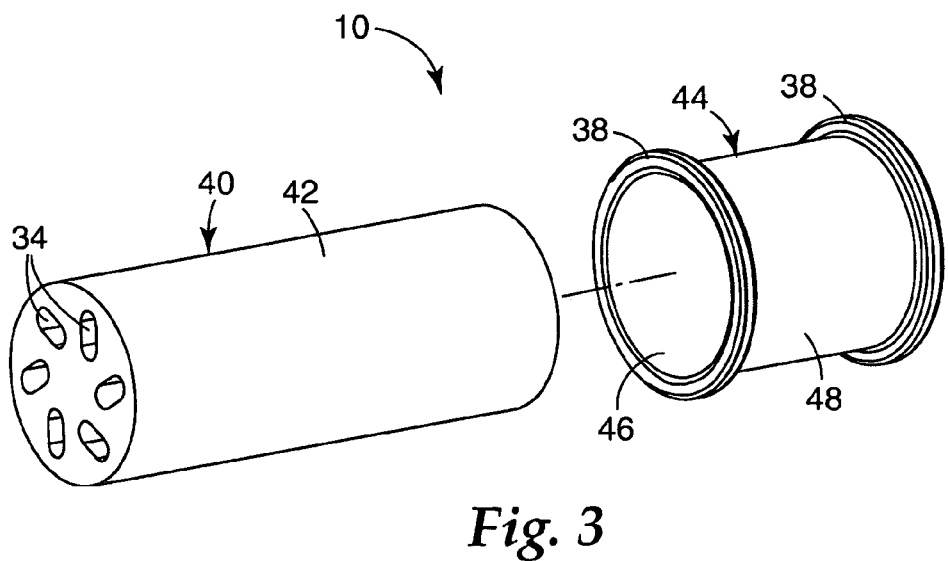
FIG. 3 is an exploded perspective view of one embodiment of a sealing member according to the invention.
Figure 4:
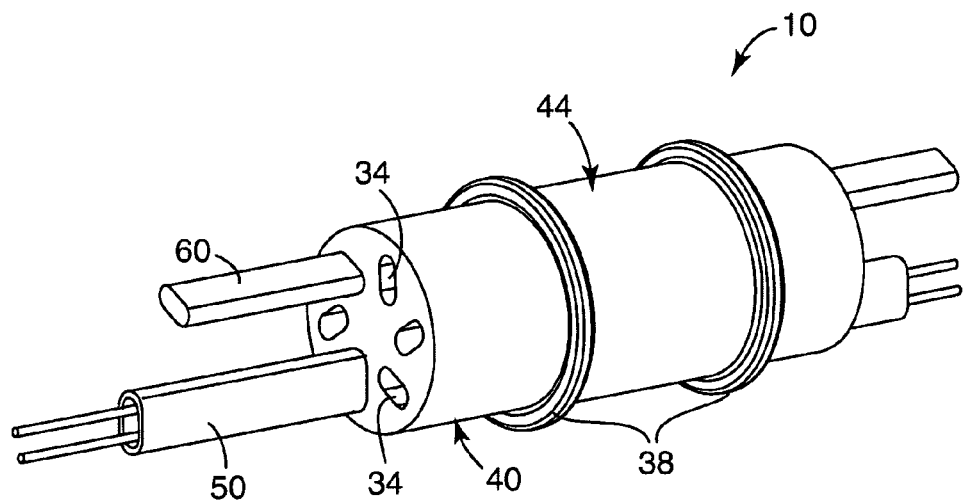
FIG. 4 is a perspective view of a sealing member having cables and plugs positioned in openings of the sealing member.

Referring to FIG. 3, in one embodiment of sealing member 10 according to the invention, elastomeric interior portion 30 is a longitudinal elastomeric grommet 40 having an exterior circumferential surface 42. The rigid exterior portion 32 of sealing member 10 is a rigid sleeve 44 having an interior circumferential surface 46 and an exterior circumferential surface 48. The interior circumferential surface 46 of the sleeve 44 is configured to sealingly engage the exterior circumferential surface 42 of the elastomeric grommet 40. The exterior circumferential surface 48 of the sleeve 44 is configured for sealing engagement with an entry port 12 of the enclosure 14, and particularly configured for sealing engagement with gasket 20 lining an entry port 12. In one embodiment, the interior circumferential surface 46 of sleeve 44 and exterior circumferential surface 42 of elastomeric grommet 40 are dimensioned such that elastomeric grommet 40 is press-fitted into sleeve 44. In another embodiment, sleeve 44 is over-molded onto elastomeric grommet 40. In other embodiments, elastomeric grommet 40 is attached to sleeve 44 by means such as adhesive, ultrasonic welding, or fusion bonding.

In one embodiment, sleeve 44 extends longitudinally over grommet 40 to cover in the range of ⅓ to ⅔ of the length of grommet 40. In another embodiment, sleeve 44 extends longitudinally over grommet 40 to cover more than approximately ⅔ of the length of grommet 40. In another embodiment, sleeve 44 extends longitudinally over grommet 40 to cover less than approximately ⅓ of the length of grommet 40.

In the illustrated embodiments, grommet 40 is shown as a unitary structure requiring cables 50 to be threaded through passages 34 of the grommet 40. In other embodiments, grommet 40 is formed such that cables may be laid into passages extending longitudinally through the grommet. For example, grommet 40 may be a segmented grommet as shown and described in U.S. patent application Ser. No. 10/929,659, filed Aug. 30, 2004, and titled "Sealing Member For Enclosures", which is commonly assigned herewith and incorporated herein in its entirety. In other embodiments, grommet 40 may be a rolled grommet as shown and described in U.S. Pat. No. 6,242,700, titled "End Seal Assembly For A Splice Case", which is commonly assigned herewith and incorporated herein in its entirety.

In one embodiment, sealing member 10 comprises a single element. For example, sealing member 10 may be molded from a polymeric material having elastomeric properties required for sealing engagement with longitudinal members extending through passages 34. The exterior surface 36 of sealing member 10 may be treated to provide a harder or more rigid exterior surface 36. For example, the external surface 36 could be irradiated to crosslink material of the sealing member 10 to a limited radial depth from the external surface 36. Alternatively, the external surface 36 of sealing member 10 could be exposed to a reactive monomer or oligomer to swell or otherwise modify the properties of external surface 36. For example, supplemental reaction of an oligomer would yield an interpenetrating network which, assuming the proper oligomeric substance, could yield a harder surface region. Alternatively, sealing member 10 could be manufactured using a co-injection molding process that utilizes two different materials to provide the desired properties for elastomeric interior portion 30 and rigid external portion 32, where there is no well defined phase boundary between the two different materials.

In each embodiment, sealing member 10 has a size and shape selected to match the size and shape of an entry port 12 of enclosure 14, such that when sealing member 10 is installed and secured in the entry port 12 (such as by clamping between bottom portion 16 and top portion 18), the exterior portion 32 of sealing member 10 seals against the entry port portion 22 of gasket 20 extending about the circumference of the entry port 12. Although sealing member 10, sleeve 44 and grommet 40 in FIGS. 1–5 are illustrated as having a generally circular transverse cross-sectional shape, it is within the scope of the invention that sealing member 10, sleeve 44, and/or grommet 40 may have other transverse cross-sectional shapes as necessary to complement the size and shape of the entry port 12 of enclosure 14. Further, the sealing member 10 may have a shape and/or size that changes between first end 26 and second end 28, so that different portions of exterior portion 32 of sealing member 10 can sealingly engage entry ports 12 of varying shapes and sizes. For example, exterior portion 32 of sealing member 10 may have a stepped diameter, or may change from a circular shape to an oval shape, for example. In some embodiments, exterior portion 32 may have a transverse cross-sectional shape that is different from the transverse cross-sectional shape of interior portion 30. For example, longitudinal elastomeric grommet 40 may have a substantially cylindrical shape, such that exterior circumferential surface 42 of grommet 40 has a circular transverse cross-sectional shape. Sleeve 44 forming exterior portion 32 may have an interior circumferential surface 46 that has a circular transverse cross-sectional shape for receiving grommet 40, and an exterior circumferential surface 48 that has a non-circular transverse cross-sectional shape, such as an oval shape.

In the exemplary embodiments of sealing member 10, six passages 34 are illustrated. In addition, passages 34 are illustrated as all having substantially the same size and shape. However, in other embodiments, the number of passages 34 may be one or more, and passages 34 may have different sizes and different shapes, selected as necessary to accommodate the types and sizes of cables used with enclosure 14. Passages 34 may have irregular cross-sectional shapes along their length. For example, a passage 34 may have ridges for improved sealing, may be non-linear, such as a labyrinth-type passage, or may be tapered along its length, such that the transverse cross-sectional area of the passage varies between first end 26 and second end 28 of sealing member 10.

In the illustrated sealing member 10, cables 50 are installed in passages 34 by threading a free end of the cable through the passages. If a cable 50 is not available to fill each of the passages 34, a plug 60 may be inserted into an otherwise empty passage 34, such that the passage 34 is blocked to prevent the ingress of moisture, dust, insects, and the like through the passage and into the enclosure. Commonly, a variety of cable sizes and shapes will be used with seal 10. Typical cable shapes include, but are not limited to, circular, elliptical, oblong and substantially rectangular cross-sections. As described above, passages 34 within a single sealing member 10 may have different sizes and different shapes selected as necessary to accommodate the types and sizes of cables used with the enclosure 14.

After each of the passages 34 has been filled with a cable 50 or plug 60 (FIG. 4), sealing member 10 is ready for installation in entry port 12 of enclosure 14 as if it were a single larger cable. Sealing member 10 is installed in entry port 12 by first separating bottom portion 16 and top portion 18 of enclosure 14. Gasket 20 is positioned on bottom portion 16, and an entry port portion 22 of gasket 20 is opened along its slit 24. Sealing member 10 is inserted through the opened slit 24, and positioned longitudinally such that entry port portion 22 of gasket 20 is positioned between ridges 38 of sealing member 10. Sealing member 10 and surrounding entry port portion 22 of gasket 20 are thereby positioned in the portion of entry port 12 defined by bottom portion 16. Sealing member 10 and/or the cable(s) extending therethrough may optionally be secured to strain relief brackets 70 inside of enclosure 14 using a conventional securing device 71, such as cable ties, hose clamps, or the like (see FIG. 5). The securing device 71 used to secure sealing member 10 to strain relief brackets 70 may further beneficially provide additional sealing pressure on cables 50 and/or plugs extending through passages 34. In one embodiment, enclosure 14 may be provided with exterior strain relief means, such as the strain relief brackets 72 illustrated on bottom portion 16. Sealing member 10 and/or cables extending therethrough may be secured to exterior strain relief brackets 72 using a conventional securing device 73, such as cable ties, hose clamps, or the like (see FIG. 5). Finally, top portion 18 is installed and secured to bottom portion 16 using bolts, clamps, or the like, and thereby clamping sealing member 10 and gasket 20 therebetween.

Figure 5:
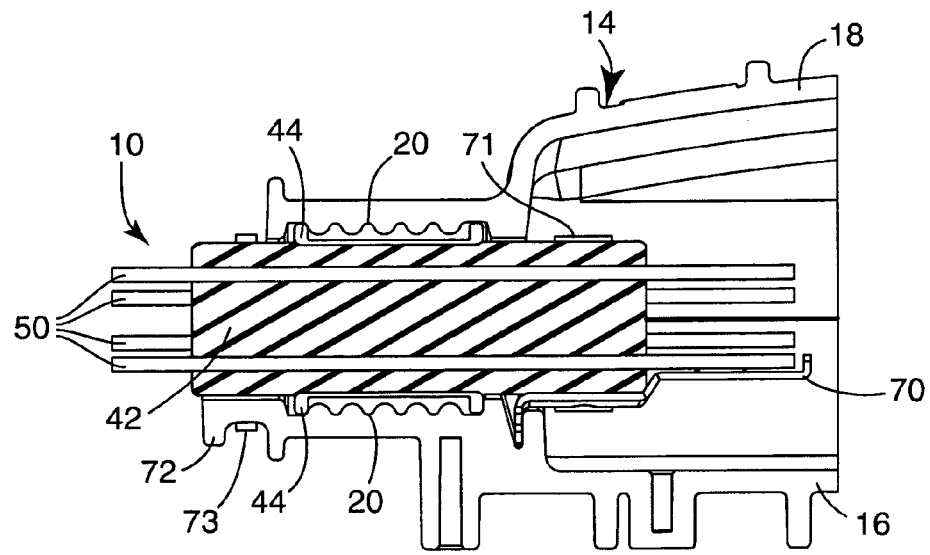
FIG. 5 is a cross-sectional illustration of the sealing member of FIG. 3, illustrating the sealing member installed in an entry port of an enclosure.

The resulting seal is illustrated in FIG. 5. The elastomeric interior portion 30 (i.e., grommet 40 in FIG. 5) to creates a compliant, compressive seal around cables 50 and/or plugs 60 as they pass through sealing member 10. At the same time, the soft, pliable gasket 20 of the entry port 12 is securely contained by ridges 38 of the rigid exterior portion 32 (i.e., sleeve 44 in FIG. 5) and compressed between enclosure 14 and rigid exterior portion 32 to form a tight seal.

The sealing member 10 described herein can be manufactured by multiple conventional methods including, but not limited to, injection molding, extrusion, casting and machining. The sealing member 10 can be fabricated as a single unit, and may be formed from a single material, or formed from a combination of multiple materials molded or extruded as a single unit. The sealing member 10 can be fabricated as multiple components that are assembled to form the completed sealing member.

The materials used to fabricate the sealing member 10 and elements thereof are selected depending upon the intended application. Elastomeric interior portion 30 may be formed from, for example, elastomeric and polymeric materials, such as thermoplastic elastomers, vulcanite rubbers, polyurethane foams, reactive and non-reactive polymers, and soft plastics, to name a few. Material selection will depend upon factors including, but not limited to, cable durometers, chemical exposure conditions, environmental exposure conditions including temperature and humidity conditions, and flame-retardancy requirements, to name a few. In a preferred embodiment, the material of interior portion 30 is an elastomeric material that deforms sufficiently to allow passages 34 to be opened and closed as described above, and that provides a resilient seal against cables 50 and plugs 60. In one embodiment, the material has a hardness in the range of 20 to 90 durometer (Shore 'A'). In one embodiment, the material has a hardness in the range of 40 to 60 durometer (Shore 'A'). In one embodiment, the material properties of elastomeric interior portion 30 substantially the same as the material properties of gasket 20.

The rigid exterior portion 32 may be formed from, for example, molded plastic, machined metal, or cast metals or polymers. Exemplary suitable polymer materials include olefins, polyesters, composites, epoxies, and engineering resins. Exemplary suitable metals include aluminum and stainless steel. Material selection will depend upon factors including, but not limited to, chemical exposure conditions, environmental exposure conditions including temperature and humidity conditions, and flame-retardancy requirements, to name a few. In one embodiment, the rigid sleeve has a hardness greater than about 90 durometer (Shore 'A'). In one embodiment, sleeve 44 is formed from Celcon® Acetal copolymer UV90Z (available from Ticona Engineering Polymers of Florence, Ky.). In one embodiment, rigid exterior portion 32 has a tensile modulus of greater than about 300,000 psi. In one embodiment, rigid exterior portion 32 has a tensile stress at yield greater than about 8,000 psi. In one embodiment, the material properties of the rigid exterior portion 32 are about the same as the material properties of enclosure 14.

Although described herein with respect to cables, it is within the scope of the invention that the sealing member 10 can be used in many diverse applications that require sealing around members passing through an entry port of an enclosure, including (but not limited to) telecommunication cables, electrical power cables, optical fiber cables, copper wire cables, drop lines, branch lines, distribution lines, pipes and conduits, to name a few.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An assembly comprising:
    an enclosure having an entry port lined with a pliable gasket having an entry port portion having a width that substantially extends a longitudinal length of the entry port;
    a unitary rigid sleeve having an interior circumferential surface and an exterior circumferential surface, the exterior circumferential surface of the sleeve sealingly engaged with the pliable gasket lining the entry port of the enclosure, wherein the exterior circumferential surface of the sleeve includes a first circumferential ridge and a second circumferential ridge thereon, the first and second ridges containing the gasket lining the entry port therebetween, wherein a spacing between the first and second ridges corresponds to the width of the entry port portion of the gasket;

an elastomeric body having an exterior circumferential surface, a first end and a second end, the exterior circumferential surface of the elastomeric body sealingly engaged with the interior circumferential surface of the rigid sleeve; and at least one passage extending longitudinally through the elastomeric body from the first end to the second end, the at least one passage configured to sealingly engage a component therein.

2. The assembly of claim 1, further comprising a plurality of passages extending through the elastomeric interior portion from a first end to a second end of the body, each of the plurality of passages configured to receive at least one longitudinal member therein.

3. The assembly of claim 1, wherein the elastomeric body is press-fit into the rigid sleeve.

4. The assembly of claim 1, wherein the elastomeric body is attached to the rigid sleeve by one of adhesive, ultra-sonic welding, fusion boding, and interference press fit between the interior circumferential surface of the sleeve and the exterior circumferential surface of the elastomeric body.

5. The assembly of claim 1, wherein the elastomeric body has a hardness in the range of about 20 to about 90 durometer (Shore 'A'), and the rigid sleeve has a hardness greater than about 90 durometer (Shore 'A').

6. The assembly of claim 1, further comprising a plug configured for insertion into the at least one passage, the plug configured to block the passage.

7. The assembly of claim 1, wherein the elastomeric body is a unitary structure.

8. The assembly of claim 1, wherein the elastomeric body is formed from a material selected from thermoplastic elastomers, thermoplastic vulcanite rubbers, polyurethane foams, reactive polymers, non-reactive polymers, silicones, EPDMs, and soft plastics.

9. The assembly of claim 1, wherein the rigid sleeve is formed from a material selected from olefins, polyesters, engineering resins, composites, epoxies, and metals.

10. The assembly of claim 1, wherein a hardness of a material forming the sleeve is about the same as a hardness of a material forming the enclosure.

11. The assembly of claim 1, wherein a hardness of a material forming the gasket is about the same as a hardness of a material forming the elastomeric body.

* * * * *